United States Patent [19]

Yonenaga

[11] Patent Number: 5,084,773
[45] Date of Patent: Jan. 28, 1992

[54] IMAGE READING PROCESSING APPARATUS

[75] Inventor: Hitoshi Yonenaga, Hitachi, Japan

[73] Assignee: Hitachi, Ltd., Tokyo, Japan

[21] Appl. No.: 532,643

[22] Filed: Jun. 4, 1990

[30] Foreign Application Priority Data

Jun. 7, 1989 [JP] Japan .................................. 1-142884

[51] Int. Cl.⁵ ............................................ H04M 1/04
[52] U.S. Cl. ................................... 358/472; 358/473; 358/486; 358/488
[58] Field of Search ............... 358/472, 473, 486, 488, 358/445, 444, 497; 382/59, 56, 54

[56] References Cited

U.S. PATENT DOCUMENTS

| | | | |
|---|---|---|---|
| 4,327,381 | 4/1982 | Amicel | 358/486 |
| 4,642,700 | 2/1987 | Ohta et al. | 358/488 |
| 4,864,416 | 9/1989 | Ishikawa | 358/486 |
| 4,899,228 | 2/1990 | Sano et al. | 358/473 |
| 4,969,054 | 11/1990 | Tsuji et al. | 358/473 |

*Primary Examiner*—Michael Razavi
*Attorney, Agent, or Firm*—Antonelli, Terry, Stout & Kraus

[57] ABSTRACT

An image read processing apparatus includes an image reading unit movable relative to a medium surface on which an image to be read is recorded. The image reading unit reads the image on the medium surface by repeating a line scanning in a direction substantially perpendicular to the direction of movement of the image reading unit relative to the medium surface during a period of time when the direction of the relative movement is a predetermined direction, and outputs image data representative of the read image and movement data concerning the relative movement. The apparatus further includes a detector for detecting the direction of the movement of the image reading unit relative to the medium surface on the basis of the movement data. When the detected movement direction is a direction substantially different from the predetermined direction, an other-direction moving distance is determined by which the image reading unit has been moved in the different direction. When a blank region including no image data continues spanning a predetermined distance and over during the movement of the image reading unit in the predetermined direction, a distance of the blank region defined by a moving distance of the image reading unit is changed on the basis of the other-direction moving distance.

11 Claims, 11 Drawing Sheets

F I G. 3B
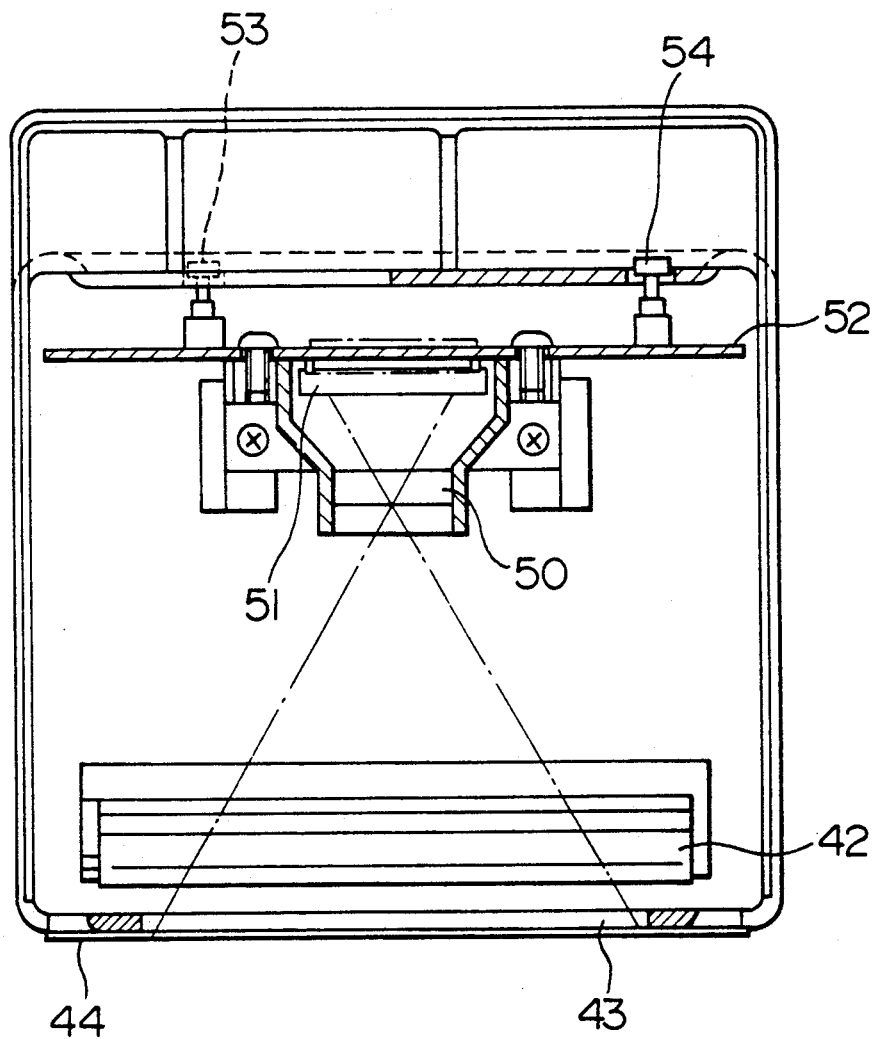

UPON POSITIVE ROTATION

UPON REVERSE ROTATION

IMAGE READING PROCESSING APPARATUS

BACKGROUND OF THE INVENTION

1. Field of The Invention

The present invention relates to an image reading processing apparatus, and more particularly to an image read processing apparatus having an image reader which can be manually moved on a recording medium so that a visible image recorded on the recording medium is subjected to photoelectric conversion to be outputted as image data.

2. Description of The Related Art

In information processing such as document editing by an information processor such as a personal computer or a word processor, a simple image reader has been proposed in order that an image recorded on a recording medium such as a paper is on a document to be edited.

Such an image reader is provided with illuminating means, photoelectric conversion means, movement detecting means, and control means. By manually moving the image reader on a recording medium, the recording medium is illuminated and light reflected from the recording medium is photoelectric-converted into data for every unit length of movement of the image reader. In many cases, the data contains data of an unnecessary region (for example, data of only a background including no image data). In general, therefore, processing for deleting the unnecessary data portion is performed by an information processor through a subsequent inputting operation from a keyboard by an operator.

JP-A-62-125770 discloses an image reading processing apparatus in which position information obtained in accordance with the direction and length of movement of an image reader for reading of an image is used as an address in a memory for read data and thereafter this address is inputted to extract only necessary read data.

However, those image readers involve a problem that a troublesome two-step operation is required since read data is obtained by moving the image reader on the recording medium and an inputting operation for editing such as extraction of only necessary read data is thereafter performed.

SUMMARY OF THE INVENTION

An object of the present invention is to allow the editing of read data by consecutive reading operations when an image reader is manually moved, thereby simplifying the subsequent editing operation of read data.

Here, the expression "editing of read data" means the erasing of an unnecessary region of read data (or the extraction of necessary read data) and a change of a distance between image regions.

To attain the above object, an image reading processing apparatus according to the present invention comprises image reading means which has an elongated and substantially straight-line reading aperture and which when the reading aperture is moved in a direction substantially perpendicular to the direction of elongation of the reading aperture and in a contact with a surface of a medium on which an image to be read is recorded, successively reads a portion of the image recorded on the medium surface in contact with the reading aperture. The reading means also outputs image data representative of the read image portion and movement data concerning the movement of the aperture. A control means defines a position of an image represented by the image data based on the movement data and editing the image data so that it includes information indicative of the defined position. The control means includes means for detecting a direction of movement of the reading aperture relative to the medium based on the movement data, means for validating the image data read during the movement of the reading aperture when the detected direction of movement substantially coincides with a predetermined direction and for invalidating the data when the detected direction of movement is substantially different from the predetermined direction, means for determining, when the detected direction of movement is substantially different from the predetermined direction by movement of the reading aperture a distance measured in another direction moving distance by which the reading aperture, and blank-distance changing means for changing, when a blank region including no image data continues at least a predetermined distance during the movement of the reading aperture in the predetermined direction with a distance of the blank region being defined by the distance of movement of the reading aperture in the other direction, and memory means for storing the edited image data.

According to the present invention, in the case where the image on the recording medium to be read includes a plurality of separated blocks and the image is to be displayed or printed based on image data obtained by the image reading means, a distance between any two blocks can be simply changed by moving the image reading means during the reading operation in a direction different from the predetermined reading direction, preferably, in a direction reverse to the predetermined reading direction and adjusting the reverse-direction moving distance.

BRIEF DESCRIPTION OF THE DRAWINGS

FIG. 3B is a cross section taken along line IIIB—IIIB in FIG. 3A;

DESCRIPTION OF THE PREFERRED EMBODIMENTS

An embodiment of the present invention will now be explained with reference to the accompanying drawings.

Figure 2:
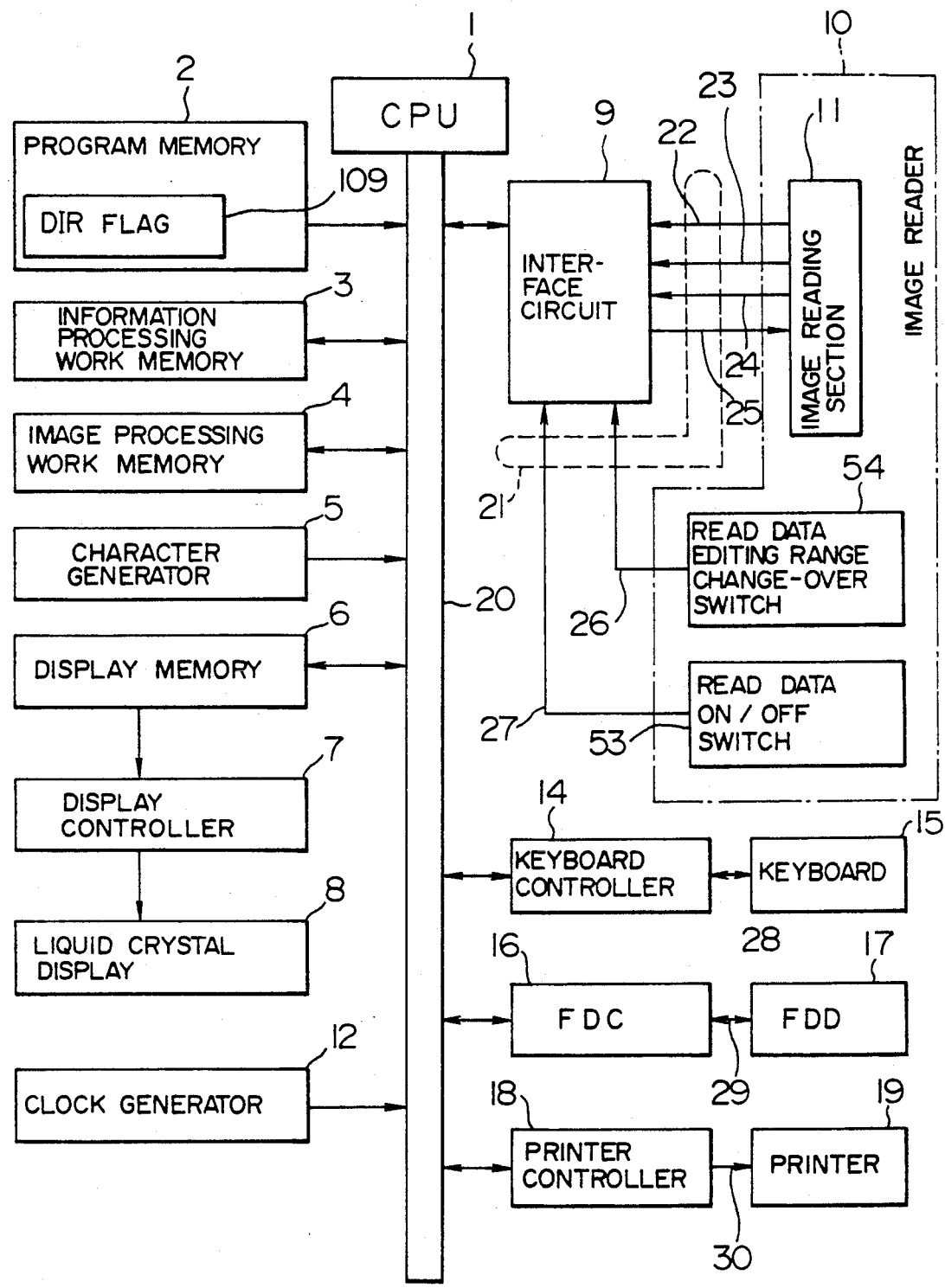
FIG. 2 is a block diagram showing the construction of an image read processing apparatus according to the embodiment of the present invention.

FIG. 2 is a control block diagram of an image read processing apparatus according to the present invention applied to an information processor such as a word processor. In FIG. 2, an image reader 10 includes an image reading section 11, a read data editing range change-over switch 54 and a read data ON/OFF switch 53 which is connected through a cable 21 to an interface circuit 9 in the body or main unit of the image read processing apparatus. The cable 21 includes a direction (DIR) signal line 22, a start signal line 23, a read information signal line 24 for read data, data clocks, and so on, a power supply line 25, a read data editing range change-over signal line 26 and a read data ON/OFF signal line 27. Reference numerals 28, 29 and 30 designate cables which connect a keyboard 15, a floppy disk device (FDD) 17 and a printer 19 to a keyboard controller 14, a floppy disk controller (FDC) 16 and a printer controller 18 in the body of the image, read processing apparatus, respectively. Input data, data to be stored and data to be printed are transmitted through the cables 28, 29 and 30.

A main control circuit in the body of the image read processing apparatus mainly includes a central processing unit (CPU) 1 which is a stored-program type of computing unit. The main control circuit is provided with a program memory 2 for storing a program which the CPU 1 executes when the image read processing apparatus performs functions as an information processor after turn-on of a power supply, an information processing work memory 3 for storing information processing data as inputted thereto, an image processing work memory 4 for storing read data including image data and movement data which are inputted from the image reader 10, a character generator 5 for storing character codes indicative of dot data representing characters by dot matrices and outputting the dot data corresponding to an inputted character code, a liquid crystal display 8 for displaying an image represented by the image data, a display memory 6 for storing the image data used for displaying the image, a display controller 7 for transferring the stored data of the display memory 6 to the liquid crystal display 8 periodically at a predetermined time interval to display the data, the keyboard controller 14 for controlling the keyboard 15, the FDC 16 for controlling the FDD 17, and the printer controller 18 for controlling the printer 19 to print information. These components are connected to the CPU 1 by a bus line 20. The timing of the operation of the whole of the apparatus is determined by clock pulses generated by a clock generator 12.

Figure 3A:
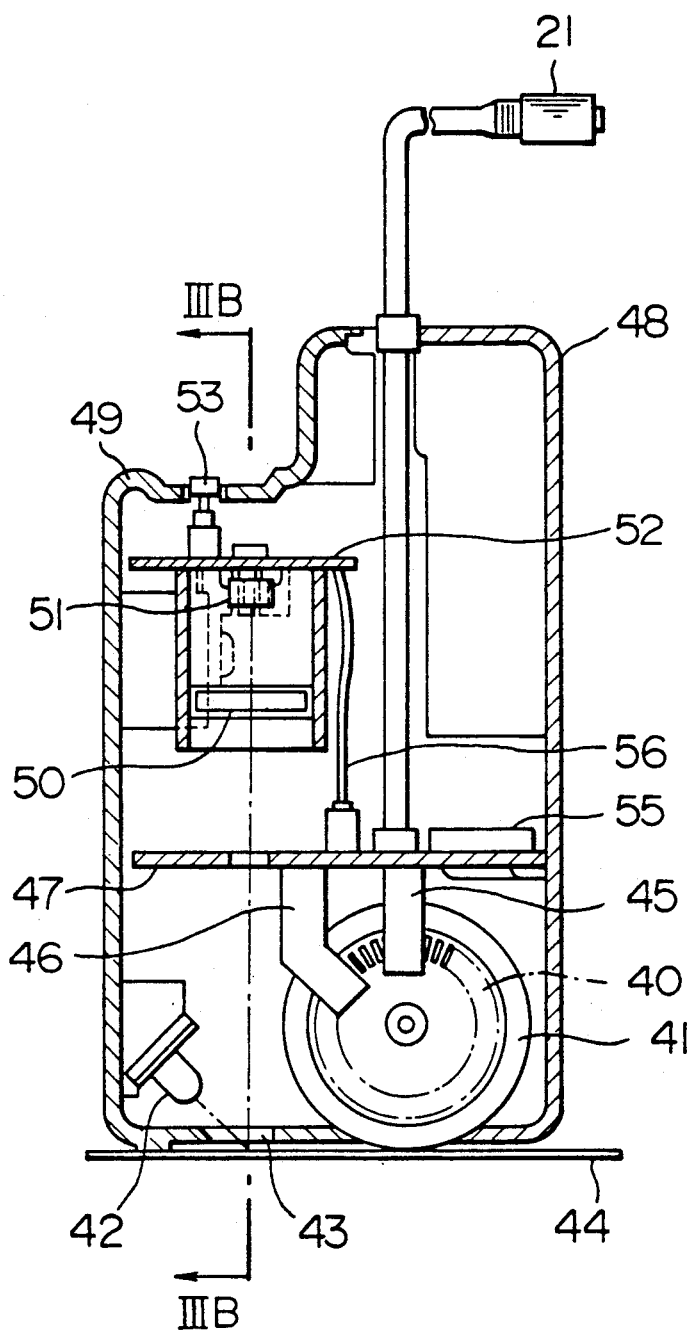
FIG. 3A is a longitudinal cross section of the image read processing apparatus according to the embodiment of the present invention.

FIG. 3A is a longitudinal cross section showing the structure of the image reader 10 and FIG. 3B is a cross section taken along line IIIB—IIIB in FIG. 3A. A pair of rolling rollers 41, only one of which is shown in FIG. 3A, are provided at a bottom portion of a front case 48 of the image reader 10 so that the image reader can be moved in the direction of rotation of the rollers and in contact with a surface of a medium or original 44 on which an image to be read is recorded. One of the rollers 41 is integrally provided with a slit disk 40 having a circumferential slit portion where radially extending slits are formed at equal intervals in a circumferential direction such that there exist a predetermined number of the slits along a unit distance in the circumferential direction. A first photo-interrupter 45 and a second photo-interrupter 46 are provided opposite to the slit portion of the slit disk 40 and spaced from each other by a predetermined interval in a direction of rotation of the slit disk 40. At a bottom portion of a rear case 49 is provided a slit-like elongated reading aperture 43 extending in a direction substantially perpendicular to a direction in which the image reader 10 moves on the original 44. A light source 42, such as a light emitting diode array, is provided above the reading aperture 43 for illuminating the original 44. On a sensor substrate 52, there are provided a lens 50 at a position where light reflected from the original 44 can be received and, an image sensor 51 at a focus plane of the reflected light projected through the lens 50. Further, the read data on/off switch 53 and the read data editing range change-over switch 54 are provided for manual operation by an operator. On a control substrate 47 are mounted the first photo-interrupter 45, the second photo-interrupter 46, an end terminal of a cable 56 for connection with the sensor substrate 52, an end terminal of a cable 21 for connection with the interface circuit 9 of the main control circuit in the body of the image read processing apparatus, and a control circuit section 55 provided in the image reading section 11 to control the reading of an image.

The image reader 10 having the above construction operates as follows. When the image reader 10 is set on the original 44 after the execution of an initializing procedure for start of the operation and is then manually moved, the rolling rollers 41 is rotated according to the movement of the image reader 10 and the movement of the image reader 10 is detected by means of the slit disk 40, the first photo-interrupter 45 and the second photo-interrupter 46 in synchronism with the rotation of the rollers 41 so that the output signals of the photo-interrupters 45 and 46 are inputted to the control circuit section 55 in the image reading section 11. At the same time, the light source 42 is turned on so that the light reflected from the original 44 as illuminated by the light source 42 is received by the image sensor 51 through the lens 50 and photoelectric-converted into analog read data which is in turn inputted to the control circuit section 55. The control circuit section 55 controls the image sensor 51 mounted on the sensor substrate 52 and the first and second photo-interrupters 45 and 46 mounted on the control substrate 47 so that direction(-DIR) signal, start signal, read data signal and data clocks are outputted on the signal lines 22, 23, 24a and 24b, respectively. Also, the first switch 53 and the second switch 54, each of which is an ON/OFF switch manually operated by an operator, generate a read data ON/OFF signal and a read data editing range change-over signal on the signal line 27 and the signal line 26, respectively. Each of the read data ON/OFF signal and the read data editing range change-over signal takes a level of "0" when the associated switch is turned on and a level of "1" when it is turned off. Those signal lines 22, 23, 24a, 24b, 26 and 27 and the power supply line 25 for supplying an electric power to the image reader 10 are incorporated in the cable 21.

Figure 4:
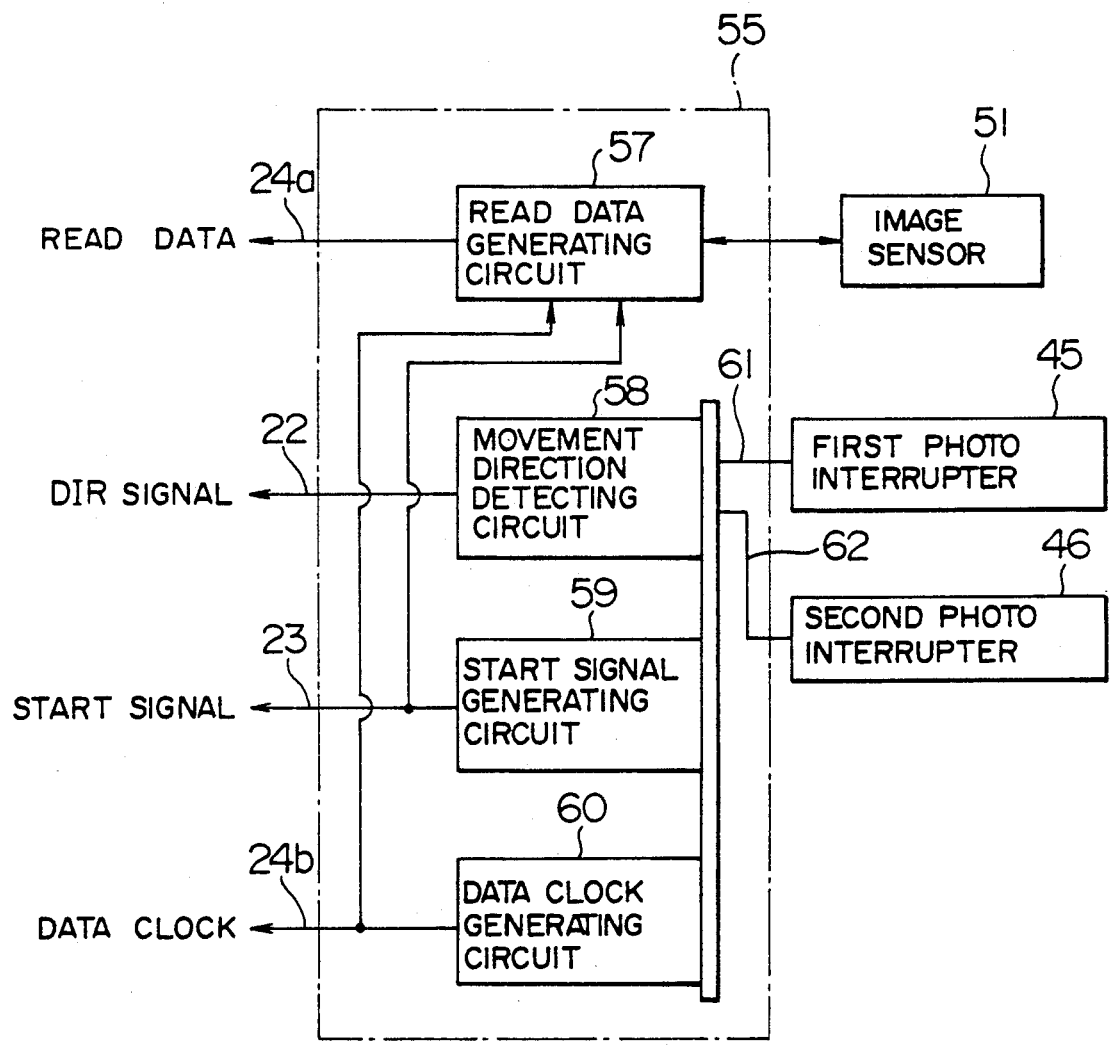
FIG. 4 is a block diagram showing the construction of a control circuit section for generating various control signals.

Next, the construction and operation of the control circuit section 55 will be explained with reference to FIG. 4. The control circuit section 55 is composed of a read data generating circuit 57, a movement direction detecting circuit 58, a start signal generating circuit 59 and a data clock generating circuit 60. The read data generating circuit 57 is connected to the image sensor 51. The movement direction detecting circuit 58, the start signal generating circuit 59 and the data clock generating circuit 60 are connected so as to receive a first detection signal and a second detection signal which are outputted from the first and second photo-interrupters 45 and 46 to signal lines 61 and 62 and have a phase difference therebetween determined by the positions of the photo-interrupters.

The read data generating circuit 57 drives the image sensor 51 based on a start signal and data clocks which will be mentioned in later. The read data generating circuit 57 receives analog read data from the image sensor 51 and converts it into a digital signal composed of binary bits which are in turn serially outputted on the signal line 24a.

The movement direction detecting circuit 58 produces a DIR signal indicative of the direction of movement of the image reader 10 based on the above-mentioned first and second detection signals. The DIR signal is outputted on the signal line 22.

The start signal generating circuit 59 generates, based on the above-mentioned first and second detection signals, a start signal indicative of the start of reading of image data detected by the image sensor upon each unit length movement of the image reader 10. The start signal is outputted on the signal line 23. The cycle of generation of the start signal depends on the moving speed of the image reader 10.

The data clock generating circuit 60 generates data clocks as transfer clocks for transfer of the read data at a timing determined by the above-mentioned first and second detection signals based on the clock pulses. The data clocks are outputted on the signal line 24b.

Figure 5A:
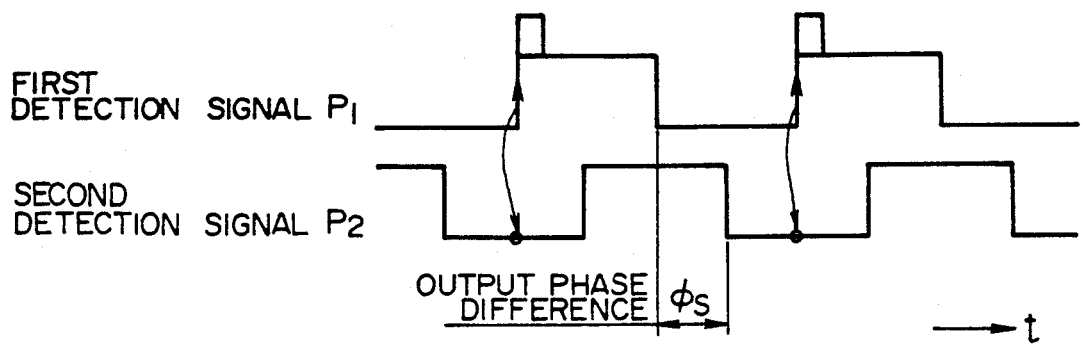
FIGS. 5A, 5B and 5C are views showing the states of signals connected with the movement of an image reader.
Figure 5B:
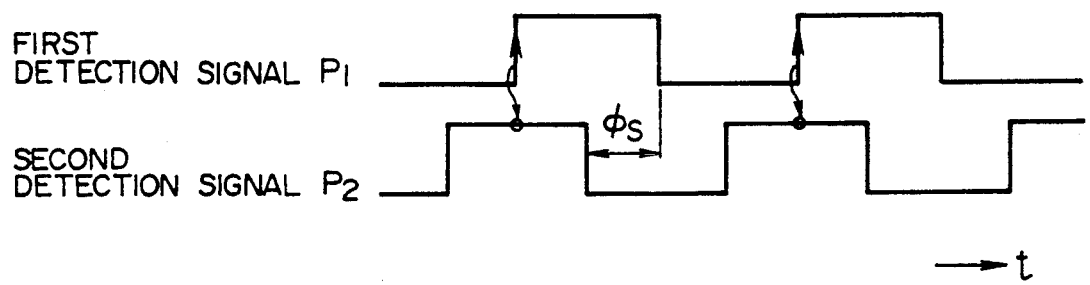
Figure 5C:
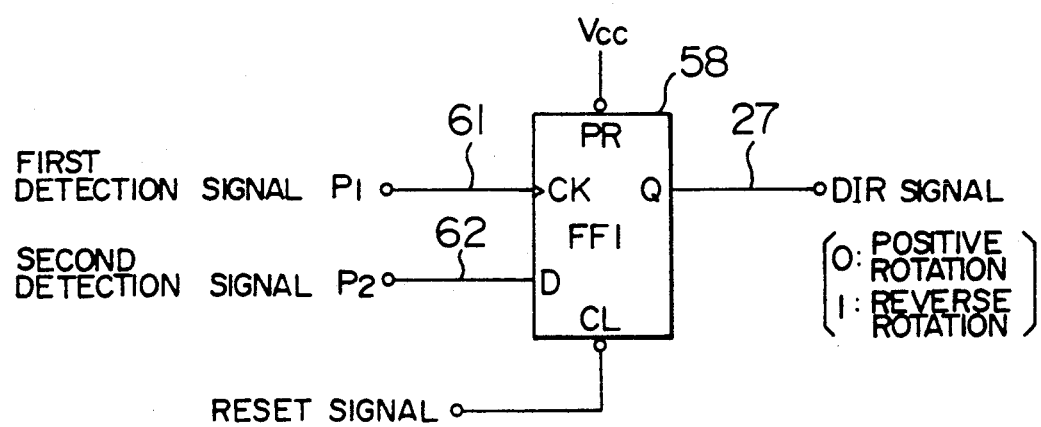

FIGS. 5A, 5B and 5C illustrate the construction and operation of the movement direction detecting circuit 58. Since the first and second photo-interrupters 45 and 46 are disposed at the predetermined interval therebetween in the direction of rotation of the slit disk 40, as mentioned above, the first and second photo-interrupters 45 and 46 provide first and second detection signals $P_1$ and $P_2$ which have a phase difference $\phi_s$ determined by the predetermined interval.

FIG. 5A shows the waveforms of the first and second detection signals $P_1$ and $P_2$ when the image reader 10 is moved in a forward direction so that the rolling rollers rotate in a positive direction. Since the first detection signal $P_1$ is temporally in advance of the second detection signal $P_2$ by a phase $\phi_s$, the second detection signal $P_2$ always takes a level of "0" at a rising edge of the first detection signal $P_1$.

FIG. 5B shows the waveforms of the first and second detection signals $P_1$ and $P_2$ when the image reader 10 is moved in a reverse direction so that the rolling rollers 41 rotate in a reverse direction. In this case, the first detection signal $P_1$ is delayed from the second detection signal $P_2$ by a time corresponding to the phase $\phi_s$. Accordingly, the second detection signal $P_2$ always takes a level of "1" at a rising edge of the first detection signal $P_1$.

FIG. 5C is a block diagram of the movement direction detecting circuit 58 constructed so as to logically process the detection signals $P_1$ and $P_2$ shown in FIGS. 5A and 5B, thereby detecting the direction of movement of the image reader 10. The circuit 58 is constructed by a flip-flop and produces a DIR signal which takes a level of "0" with positive rotation of the rolling rollers 41 (or when the image reader 10 is moved in the forward direction) and takes a level of "1" with reverse rotation of the rollers 41 (or when the image reader 10 is moved in the reverse direction). A reset signal is supplied from the CPU at a start of the operation of the apparatus, for example, by turning the power supply on and initializes the flip-flop circuit.

Figure 6:
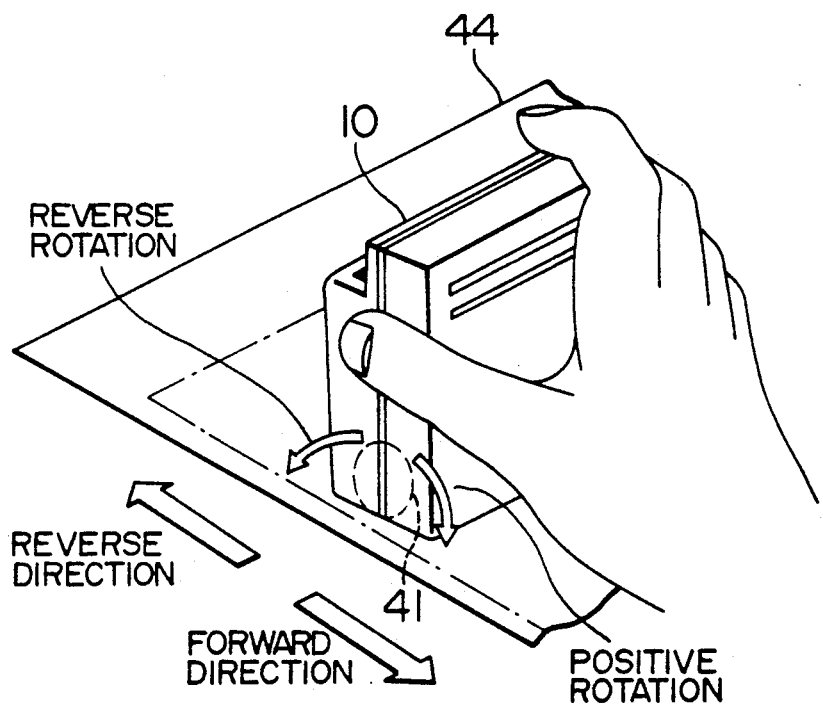
FIG. 6 is a view explaining the direction of movement of the image reader and the direction of rotation of rolling rollers.

FIG. 6 shows a relation between the direction of movement of the image reader 10 and the direction of rotation of the rolling rollers 41. The rolling rollers 41 rotate in the positive direction when the image reader 10 is moved on the original 44 in the forward direction and rotates in the reverse direction when the image reader 10 is moved in the reverse direction. In either case, the image reader 10 is moved in a direction substantially perpendicular to the direction of elongation of the elongated image reading aperture 43.

The output timings of the DIR signal, the start signal, the read data and the data clocks will be explained with reference to FIGS. 7(a) to 7(d).

Figure 7:
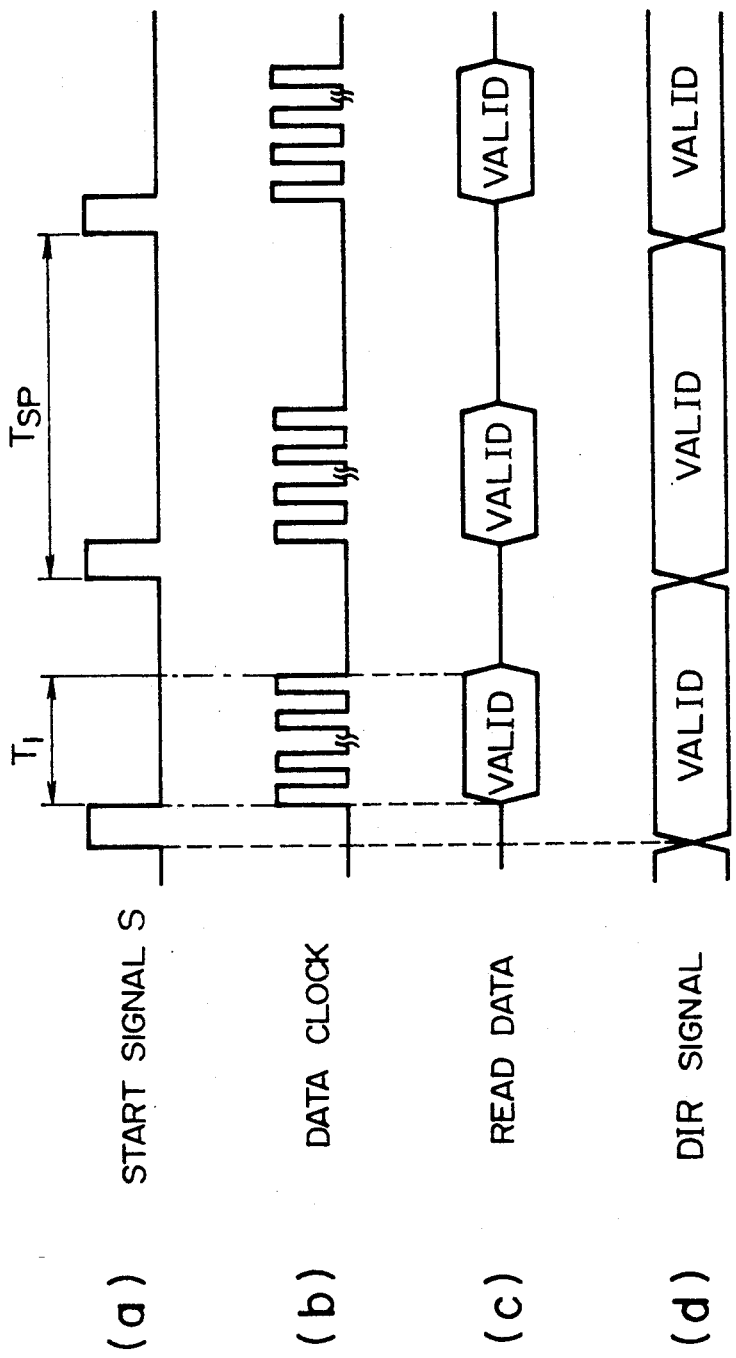
FIG. 7 is a time chart for explaining the timing in read of an image.

A start signal S is generated from the start signal generating circuit 59 in response to the rising edge of the first one of every predetermined number of pulses of the first detection pulse signal $P_1$ outputted from the first photo-interrupter 45 with movement of the image reader 10. Accordingly, a positive start pulse signal shown in FIG. 7(a) is outputted on the signal line 23 of the start signal generating circuit 59 each time the image reader 10 is moved by a predetermined distance. The period $T_{sp}$ in generation of the start pulse signals depends on the moving speed of the image reader 10 on the original 44. Namely, $T_{sp}$ is shorter when the moving speed is faster and longer when it is slower.

Data clocks and read data are outputted during a period of time T1 immediately after the generation of the start signal, as shown in FIGS. 7(b) and 7(c). The data clocks are used as synchronizing clocks for transferring the read data. The period of time $T_1$, which is a valid period of data, depends on the number of pixels or sensor elements in the image sensor 51 and is generally represented by $T_1$ = (the number of image sensor pixels) × (data clock period). The data clock period is constant and determined by the period of clock pulses generated by the clock generator 12. For example, in the case where the image sensor 51 is a linear sensor having 512 pixels or sensor elements arranged on a straight line and N start signal pulses S are generated with every 1 mm movement of the image reader 10, the data clock period is selected such that the value of $T_1 = 512 \times$ (data clock period) becomes smaller than 1/N of a time required for the 1 mm movement of the image reader 10 when the image reader 10 is moved at the maximum speed in a range of speeds at normal operation by an operator Also, the number N of start signal pulses generated with every 1 mm movement of the image reader 10 is relating to the resolution of read image data. For example, when N=8, a region of 1 mm width in the direction of movement of the image reader 10 will be scanned with eight lines.

A DIR signal is synchronous with the generation of the start signal and takes a level of "0" or "1" in accordance with the direction of movement of the image reader 10.

Figure 8:
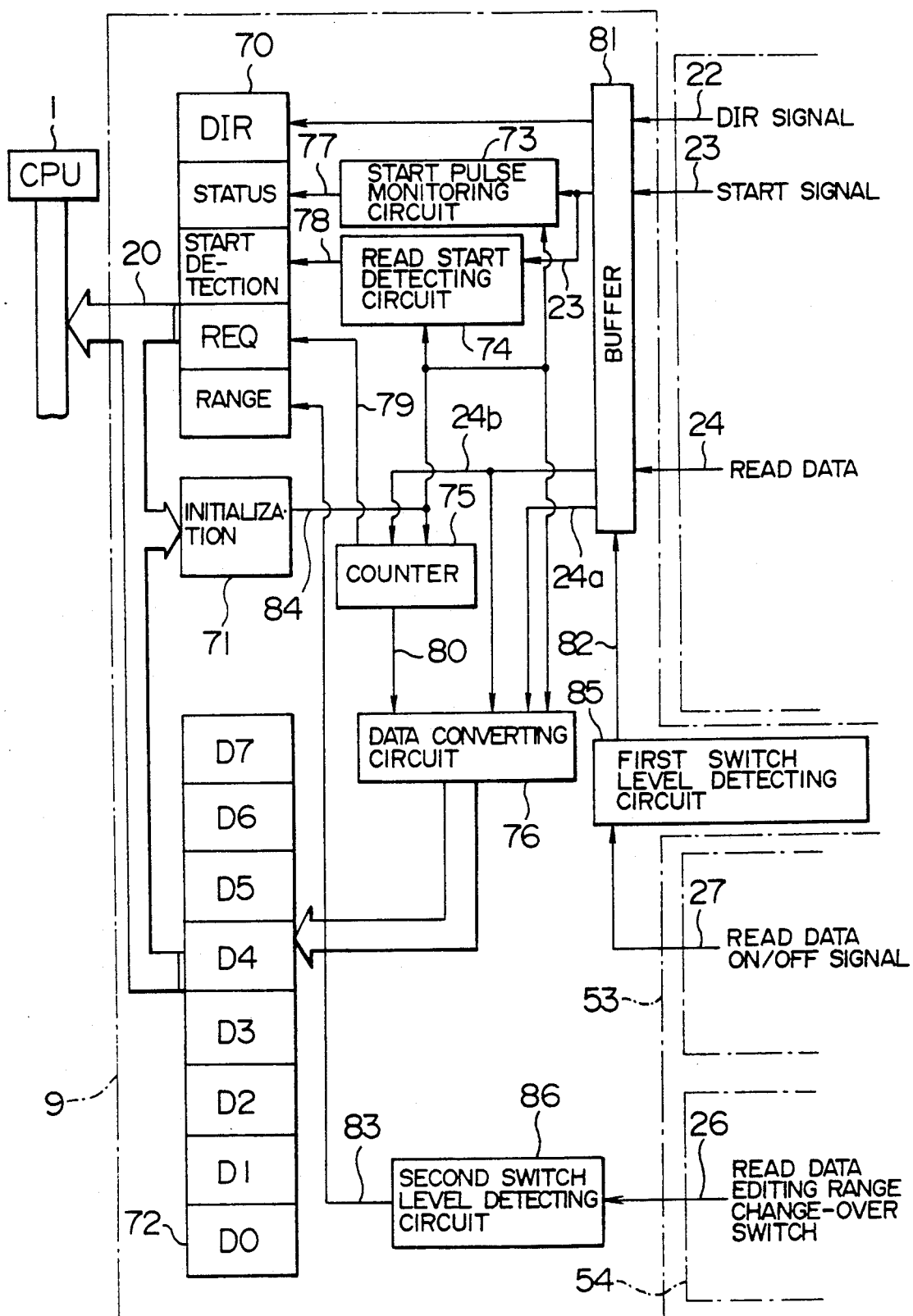
FIG. 8 is a block diagram showing the construction of an interface circuit.

Next, the construction and operation of the interface circuit 9 provided between the image reader 10 and the body of the image read processing apparatus will be explained with reference to FIG. 8.

The interface circuit 9 includes a first register 70 for storing status information which can be read by the CPU 1 through the bus line 20, a second register 71 in which control signals can be written by the CPU 1, a data converting circuit 76 for converting read data of serial bits (serial read data) inputted from the image reader 10 into data of parallel bits (parallel data) which can be read by the CPU 1, a third register 72 for storing the parallel data from data converting circuit 76 as parallel read data to be read by the CPU 1, a read start detecting circuit 74 for detecting the start signal to generate a signal which takes a level of "0" during the valid period $T_1$ after the generation of the start signal and a level of "1" during the remaining period and outputting the "0" and "1" signals on a signal line 78, and a start pulse monitoring circuit 73 for monitoring the start signal to determine the moving speed of the image reader 10 from the period of the start signal (or the number of start signal pulses per unit time), thereby judging the image reader 10 as being moved when the determined moving speed is larger than a predetermined reference speed and as being stopped when it is equal to or smaller than the reference speed, and outputting on a signal line 77 a status signal which takes a level of "1" upon judging the image reader 10 being moved and a level of "1" upon judging the image reader 10 being stopped. The start pulse monitoring circuit 73 can be realized by a hardware such as a retriggerable multivibrator or a CPU having software providing signal processing. Reference numeral 75 designates a counter for counting data clocks on a signal line 24b. The counter 75 produces on a signal line 80 a latch clock signal for transferring the parallel read data from the data converting circuit 76 to the third register 72 and produces on signal line 79 data storage completion (REQ) signal which indicates the completion of storage of data (8 bits in the present embodiment) into the first register 70. The REG signal is produced at a shorter time lag from generation of the latch clock signal. The counter 75 applies the latch clock signal to the data converting circuit 76 each time eight data clock pulses are counted. The data converting circuit 76 makes a serial-to-parallel conversion of eight pixel signals received in response to the eight data clock pulses and transfers the parallel data to the third register 72 in response to the latch clock signal. The interface circuit 9 further includes a first switch level detecting circuit 85 for detecting the level of the read data ON/OFF signal from the first switch 53 on the signal line 27 to output a read inhibition signal on a signal line 82, and a second switch level detecting circuit 86 for detecting the level of the read data editing range change-over signal from the second switch 54 on the signal line 26 to output a range signal on a signal line 83. A buffer 81 is a circuit for controlling whether or not at least one of the DIR signal, the start signal and the read data should be inputted to the internal circuits included in the interface circuit 9. The read inhibition signal on the signal line 82 is used as a control signal for the buffer 81. More particularly, in the case where the first switch 53 is depressed so that it is turned on, the read inhibition signal on the signal line 82 is a level of "0" and then the buffer 81 is brought into an inactive condition. In such a case, at least one of the DIR signal, the start signal and the read data is not inputted, Accordingly an image reading operation is not performed. On the other hand, in the case where the first switch 53 is turned off, the read inhibition signal on the signal line 82 is a level of "1". Accordingly, the buffer 81 is brought into an active condition so that an image reading operation is performed.

Next, explanation will be made of the construction of the first register 70. A DIR bit is set or reset in accordance with the level of the DIR signal. More particularly, when the direction of movement of the image reader 10 is a forward direction or a reverse direction, the rollers 41 rotate in a positive direction or a reverse direction so that the DIR signal takes a level of "0" or a level of "1". The DIR bit data can be read by the CPU 1. The CPU 1 can recognize the direction of rotation of the rollers 41 and accordingly the direction of movement of the image reader 10 by reading the DIR bit data. The DIR bit data read by the CPU 1 is stored into a DIR flag area 109 of the program memory 2. A status bit is set or reset in accordance with the level of the status signal on the signal line 77. More particularly, the status bit is "0" when the moving speed of the image reader 10 is equal to or lower than the predetermined reference speed or the image reader 10 is judged as being stopped and is "1" when the moving speed of the image reader 10 is faster than the predetermined reference speed or the image reader 10 is judged as being moved. The status bit data can be read by the CPU 1. The CPU 1 can recognize the status of movement of the image reader 10 by reading the status bit data. A start detection bit is set or reset in accordance with the level of the start detection signal on the signal line 78. More particularly, the start detection bit is "0" in the data valid period $T_1$ shown in FIG. 7(c) and "1" in the remaining period. The CPU 1 can recognize the valid period of the read data by reading the start detection bit data. A REQ bit is set or reset in accordance with the REQ signal on the signal line 79. The REG signal is used as a data extraction completion signal when the serial bits of the read data inputted through the signal line 24a are cut out or extracted with every predetermined number of bits (8 bits in the present embodiment) to be stored in the third register 72. More particularly, the REQ bit is "1" when the setting of 8 bits of data to be read by the CPU 1 into the third register 72 is completed and "0" after the CPU 1 reads the data out of the third register 72 and before setting of new read data into the third register 72. A range bit is set or reset in accordance with the level of the editing range signal on the signal line 83. More particularly, in the case where the second switch 54 is depressed so that it is tuned on, the read data editing range change-over signal on the signal line 26 takes a level of "0" and this signal is transferred as an editing range signal to the range bit. On the other hand, in the case where the second switch 54 is turned off, the read data editing range change-over signal takes a level of "1" and accordingly the range bit is "1". The CPU 1 reads the range bit through the bus line 20 and invalidates the data read by the image reader 10 when the read range bit is "0".

The second register 71 is a register in which the writing by the CPU 1 is possible. An initial signal of the second register 71 outputs an initialization signal on a signal line 84 by a reset signal from the CPU 1. The initialization signal is inputted to the start pulse monitoring circuit 73, the read start detecting circuit 74, the counter 75 and the data converting circuit 76 to initialize each of those circuits.

The third register 72 is a register which is readable by the CPU 1. The third register 72 has a function of storing the parallel read data from the data converting circuit 76 to relay it to the CPU 1.

Figure 9A:
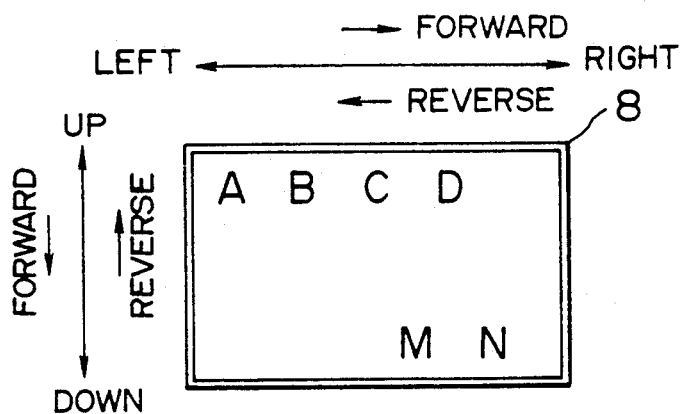
FIGS. 9A, 9B and 9C are views for explaining a relation between a display screen and the arrangement of data stored in memories.
Figure 9B:
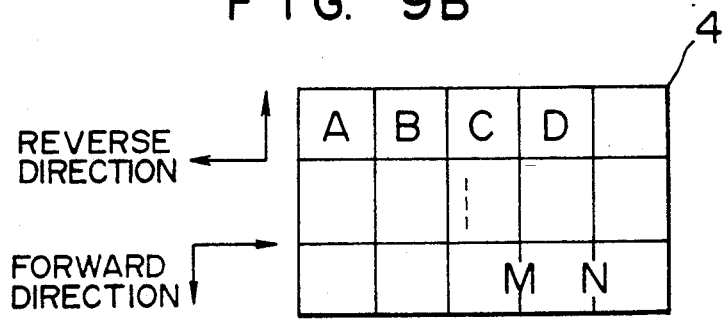
Figure 9C:
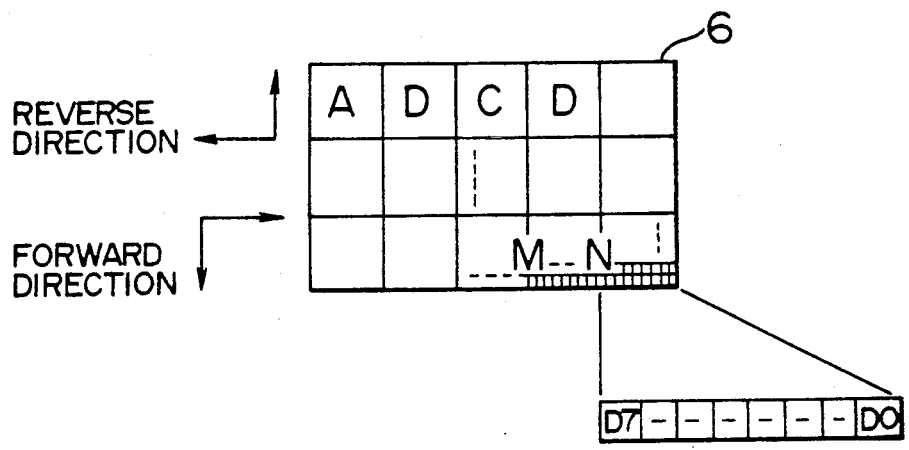

FIGS. 9A, 9B and 9C illustrate a relation between the direction in arrangement of characters to be displayed on the liquid crystal display 8 which displays data read by the image reader 10 and the arrangement of data which are stored in the image processing work memory 4 and the display memory 6.

FIG. 9A shows the direction in arrangement of characters to be displayed on the liquid crystal display 8 and FIGS. 9B and 9C show how the data of characters should be arranged in the image processing work memory 4 and the display memory 6 in order to display the data of characters as shown in FIG. 9A. The arrangement of data in each memory is defined as being a forward direction when it corresponds to a flow from left to right and from up to down on the display screen and as being a reverse direction when it corresponds to a flow from right to left and from down to up on the display screen. The CPU 1 causes the read data transferred from the image reader 10 to be stored into the image processing work memory 4 and transfers the read data to the display memory 6 to be processed for display. The data transferred to the display memory 6 is displayed on the liquid crystal display 8 by virtue of a displaying operation of the display controller 7. Display elements of the liquid crystal display 8 correspond to the data storage elements of the image processing work memory 4 and the display memory 6 in unit of one bit.

Next, an image read processing program including a feature of the present invention, among programs executed by the CPU 1 in the main control circuit of the body of the image read processing apparatus, will be explained with reference to FIG. 1.

The image read processing program is executed in accordance with a predetermined code for a selection of an image reading function inputted from the keyboard 15 by an operator so that data read by the image reader 10 is stored into the image processing work memory 4 and simultaneously written into the display memory 6 so as to be displayed on the display screen of the liquid crystal display 8.

Figure 1:
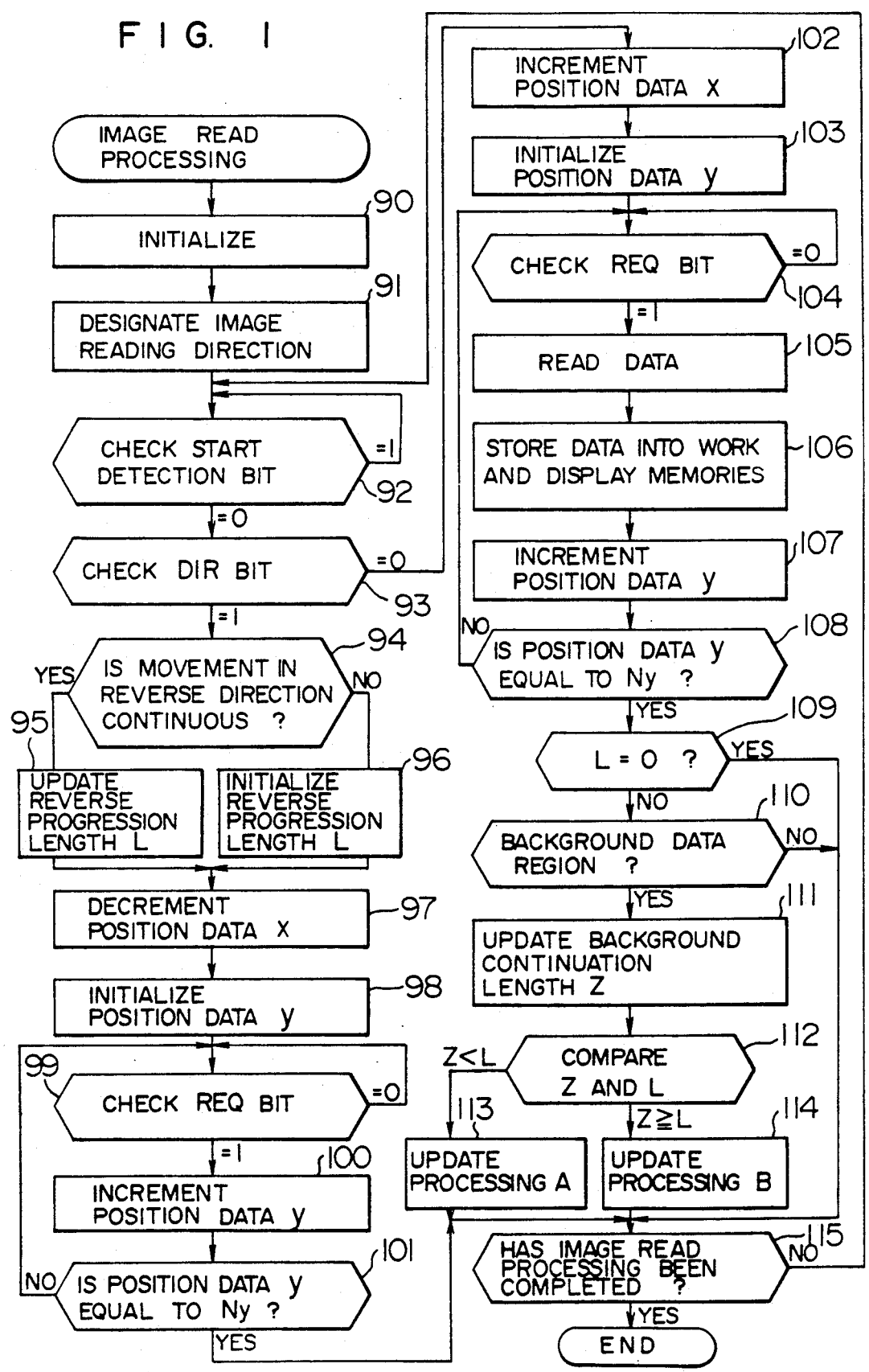
FIG. 1 is a flow chart of a data processing in an embodiment of the present invention.

Referring to FIG. 1, steps 90 and 91 are preprocesses for an image reading operation. In step 90 which is a processing for initializing the circuits included in the interface circuit 9, a work register or the like defined in the program memory 2, memories for storing data, and so on, the CPU 1 applies a reset signal to the second register 71 to initialize the start pulse monitoring circuit 73, the read start detecting circuit 74, the counter 75 and the data converting circuit 76. The work register or the like in the program memory 2 includes areas for storing data x of the position of the image reader 10 in the direction of movement thereof, data y of the position thereof in a direction (or width direction) perpendicular to the movement direction, the maximum value data $N_x$ for the position data x and the maximum value data $N_y$ for the position data y, and each item of data is set to a predetermined value which is usually 0.

Figure 10A:
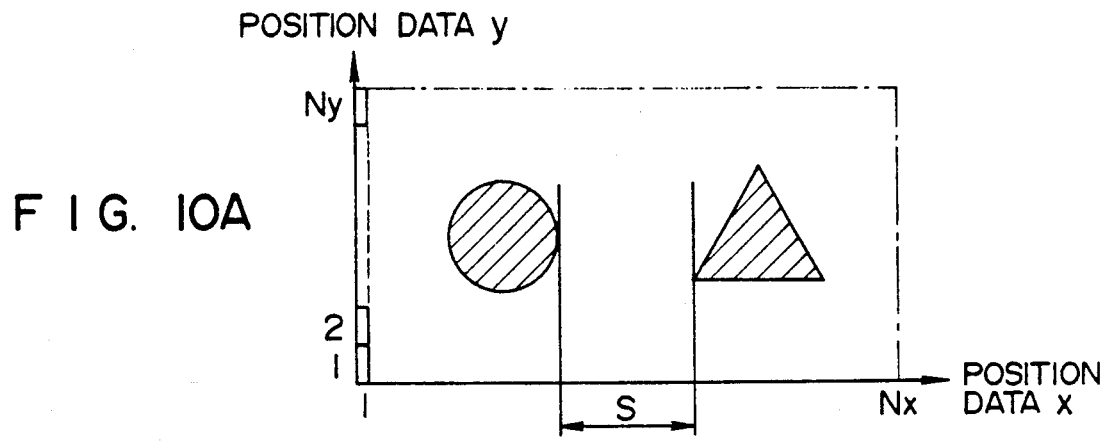
FIGS. 10A, 10B, 10C, 10D and 10E are views for explaining the movement of the image reader for adjusting a distance between blocks when an image to be read includes a plurality of separated blocks.

The position data x and y and the maximum data $N_x$ and $N_y$ will now be explained with reference to FIG. 10A. FIG. 10A shows a relation between a surface having an image to be read and the data x, y, $N_x$ and $N_y$. The case where the image on the surface to be read is read by moving the image reader 10 from left to right will be explained by way of example. The position data x is an integer (0, 1, 2, ...) and incremented one by one in synchronism with the generation of the start signal generated by rotation of the rolling rollers 41 with the movement of the image reader 10. The maximum value (or rightward extreme) for the position data x is defined to be $N_x$. The maximum value $N_x$ is determined in accordance with the size of the display 8.

At each increment of the position data x, the position data y is initialized and simultaneously the read data generating circuit 57 starts to read the image data detected by the image sensor 51. The position data y is then incremented one by one each time every predetermined number of bits, or every 8 bits in this embodiment, corresponding to the number of bits to be settable in the third register 72, which are inputted from the serial bits of the read data generated from the read data generating circuit 57 and set into the third register 72 after converted to parallel bits, are read by the CPU 1. The maximum value of $N_y$ of the position data y is determined by $N_y$=(the number of pixels or sensor elements of the image sensor 51)/(the number of bits in each cut-out or 8 bits).

Step 90 further includes a processing for initializing (or zero setting) a reverse progression length L (or a moving-distance length in a direction different from an image reading direction) defined in the program memory 2 relating to steps 95 and 96 which are described below, and a processing for initializing (or zero setting) a background continuation length Z defined in the program memory 2 relating to steps 111, 113 and 114.

Step 91 is inputting by an operator of an image reading direction and the contents of predetermined operational processings of read data from the keyboard 15. For example, a vertical reading is designated if an image to be read is directed vertically relative to the display screen of the display 8 and a lateral reading is designated if the image is directed laterally or sideways. In the case where the vertical reading is designated, the CPU 1 operates to store the read data into the image processing work memory 4 and in the display memory 6 so that the data is arranged in a vertical direction relative to the display screen. On the other hand, in the case where the lateral reading is designated, the CPU 1 operates to store the read data into the image processing work memory 4 and the display memory 6 so that the data is arranged in a lateral direction relative to the display screen. The predetermined operational processings include selecting one of processing modes performed in steps 113 and 114 or designating either an interval compression processing mode or an interval expansion processing mode, determining whether the image data and background data in read image data handled in a step 110 corresponds to "1" and "0", respectively or "0" and "1", and setting a value of the number N of background data continuation lines which provides a standard of determination whether or not the above-mentioned processing mode should be performed. When a blank region including no image data or a region including only background data continues a predetermined distance in a predetermined direction of movement of the image reader 10, the interval compression processing mode changes the distance of the blank region into a shorter distance and the interval expansion processing mode changes the distance of the blank region into a longer distance. The distance of the blank region is defined by the number N of lines scanned in response to the start signals during the movement of the image reader and corresponds to a distance defined in terms of the position data x. When the distance of the blank region defined by the number N of lines is equal to or larger than the above-mentioned predetermined value, the interval compression processing or the interval expansion processing changes the distance of the blank region into a shorter distance or a longer distance. In the case where the distance of the blank region is smaller than the set value for the number N of background data continuation lines, the corresponding region is regarded as being a part of an image region and an image data region including no blank region is called a data block. Accordingly, a region between data blocks is a background data region.

Step 92 is a process for confirming the start of the image reading operation. The processing of step 92 is repeatedly carried out during a period of time when the start detection bit of the first register 70 is "1". The program proceeds to step 93 if the start detection bit becomes "0".

Step 93, is a processing for determining the direction of movement of the image reader 10, which is performed by checking the DIR bit of the first register 70. The case where the DIR bit is "0" indicates an image reading in which the image reader 10 is moved in a forward direction. In such a case, the program proceeds to step 102. The case where the DIR bit is "1" indicates an image reading with movement of the image reader 10 in a reverse direction with the program proceeding to step 94.

At step 94, a determination is made whether or not the movement in the reverse direction continues from the proceeding scan. If the movement is continuous, the program proceeds to step 95. If the movement is a first reverse movement, the program proceeds to step 96.

At step 95, the reverse progression length L is updated or incremented. The reverse progression length L is used as a distance between read data blocks in steps 113 and 114 which will be mentioned in later.

In step 96, the reverse progression length L is initialized (or set to 1).

Data corresponding to the reverse progression length L updated at steps 95 or 96 may be written at a suitable timing into the display memory 6 to be displayed on the display screen in order that the operator can recognize the reverse progression length.

At step 97, the position data x is updated (or decremented by 1) according to the image reading operation with movement in the reverse direction.

At step 98, processing for initializing the position data y is performed in order to start processing for readout data of one line disposed at the position data x updated at step 97.

At step 99, the REQ bit of the first register 70 is checked to confirm whether or not the storage of read data (serially transferred from the image reader 10) in the third register 72 after serial/parallel conversion by the data converting circuit 76 has been completed. Step 99 is repeatedly carried out during a period of time when the REQ bit is "0". If the REQ bit becomes "1", the program proceeds to step 100.

During movement in the reverse direction of the image reader, the CPU 1 does not take in the read data but updates (or increments) the position data y is step 100.

At step 101, the position data Y updated at step 100 is compared with the maximum value $N_y$ to check the completion of one line to be processed. In the case of incompletion of one line, the program is returned to step 99. If the completion is confirmed, the program proceeds to step 115.

Step 115 is checking for determining whether or not the whole image read processing has been completed. At step 115, it is confirmed whether or not an image read processing over a predetermined range has been completed or whether or not an instruction of termination of image reading has been inputted from the keyboard 15. In the case where no image reading termination instruction is inputted, it is checked whether x is not smaller than $N_x$. If $x \geq N_x$, the flow is finished. If not, the flow is returned to step 92.

At step 102, which is carried out when a "0" lined of the DIR bit is confirmed at step 93, the position data x is updated (or incremented by 1) to start an image readout processing according to the movement of the image reader 10 in a forward direction.

At step 103, initializing the position data y is performed in order to start a processing for read data of one line disposed at the position data x updated in step 102.

At step 104, the REQ bit of the first register 70 is checked to confirm whether or not the storage of read data (serially transferred from the image reader 10) into the third register 72 after serial/parallel conversion by the data converting circuit 76 has been completed. Step 104 is repeatedly carried out during a period of time when the REQ bit is "0". If the REQ bit becomes "1", the program proceeds to step 105.

At step 105, the read data stored in the third register 72 is taken into an internal register (not shown) of the CPU 1 through the bus line 20.

At step 106, the read data taken into the internal register at step 105 is stored in the image processing work memory 4 and the display memory 6. The storage is made with reference to the image reading direction designated by the operator at step 91. In the case where the vertical reading is designated, the storage of the read data into the image processing work memory 4 and the display memory 6 is made to permit display from top to bottom on the display screen. In the case where the lateral reading is designated, the storage is made to permit display from left to right. The read data stored in the display memory 6 is displayed on the display screen.

Step 107 is performed after the read data stored in the third register 72 has been stored into a predetermined memory. At step 107, the position data y is updated (or incremented) in order to store the next read data for the line at the position data x.

At step 108, the position data y updated at step 107 is compared with the maximum value $N_y$ to confirm whether or not an image reading operation for one line at the position data x has been completed. If $y \geq N_y$, the image reading operation for one line is determined as being complete and the program proceeds to step 109. If $y < N_y$, the program is returned to step 104 to read the next data since the image reading operation is incomplete.

At step 109, whether or not the reverse progression length L is 0 is checked in order to confirm whether or not it is necessary to modify a distance between readout data blocks. If L=0, the flow proceeds to step 115. If L≠0, the flow proceeds to step 110.

At step 110, whether or not image data is included in the read data on one line at the position data x is checked to confirm whether or not the corresponding line is in a background data region between the data blocks. More particularly, in the case where no image data is present on the corresponding line and the reference to the read data of the image processing work memory 4 or the display memory 6 indicates that no image data is present over a number of lines larger than the predetermined number N of background data continuation lines, the program proceeds to step 111, regarding the corresponding line as being in a background data region. In the case where the corresponding line contains image data or a region including no image data is smaller than the predetermined number N of background data continuation lines, the program proceeds to step 115.

At step 111, the background continuation length Z is updated (or incremented by 1).

At step 112, the background continuation length Z updated at step 111 and the reverse progression length L updated at step 95 or 96 are compared with each other. In the case where the background continuation length Z is smaller than the reverse progression length L, the program proceeds to step 113. In the case where the background continuation length Z is larger than or equal to the reverse progression length L, the program proceeds to step 114.

Each of steps 113 and 114 is a processing at which a distance between two read data blocks separated by background data region spanning not less than the predetermined number N of background data continuation lines is modified into a selected distance by processing the position data x of the read data in accordance with the interval compression processing mode or the interval expansion processing mode designated at step 91.

At step 113, when the designated mode is the interval compression processing mode, the position data x is unchanged and the flow proceeds to the next processing. In the case where the interval expansion processing mode is designated, step 113 performs an update processing A as follows:

(1) (position data x after update) = (position data x before update) + (reverse progression length L), and
(2) (background continuation length Z) = (reverse progression length L).

At step 114, the following update processing B is performed for whichever of the interval compression processing mode or the interval expansion processing mode is designated:

(1) decrement the position data x by 1.

In the present embodiment, the interval compression processing mode or the interval expansion mode has been set by the selective input for designation by the operator. Alternatively, the mode may be set automatically by comparing the reverse progression length L with the background continuation length Z.

FIGS. 10A to 10E indicate examples of the image including two data blocks to be read on a plane, the moving paths of the image reader on the plane and the display of the image in which the distance between the data blocks is modified according to the present invention. It is assumed that the image reading direction is a lateral direction with the movement from left to right being taken as a forward direction and image data (black pixel) and background data (white pixel) in the read data correspond to "1" and "0", respectively.

An interval S (or a background data region) is present between two image or data blocks on the plane to be read shown in FIG. 10A.

Figure 10B:
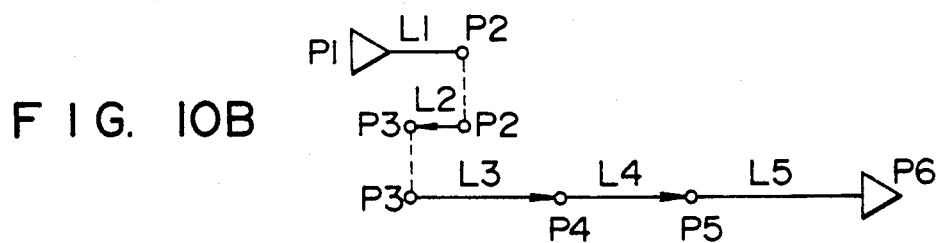
Figure 10C:

FIGS. 10B and 10C correspond to the case where the interval compression processing mode is set. The image reader 10 is moved from a position $P_1$ to a position $P_2$ and is stopped at the position $P_2$. Then, the image reader 10 is moved to a position $P_3$ with the direction of movement thereof being changed and stopped at the position $P_3$. Thereafter, the image reader 10 is moved to a position $P_6$ through positions $P_4$ and $P_5$ with the direction of movement thereof being changed again. Moving paths between the positions $P_1$ to $P_6$ are represented by $L_1$ to $L_5$. The image reader 10 is moved in a forward direction on the paths $L_1$, $L_3$, $L_4$ and $L_5$ and moved in a reverse direction on the path $L_2$. The path $L_4$ between the positions $P_4$ and $P_5$ corresponds to the interval S between the two image or data blocks.

In the image reading in this interval compression processing mode, since the position data x on the moving path $L_4$ in the background region in the interval S between the two image blocks is not incremented by more than a value corresponding to the reverse-direction movement $L_2$, an interval between the two image blocks in the image processing work memory 4 and the display memory 6 ultimately results in $L_2$. This editing processing is performed by steps 110 to 114 in the interval compression processing mode.

Figure 10D:
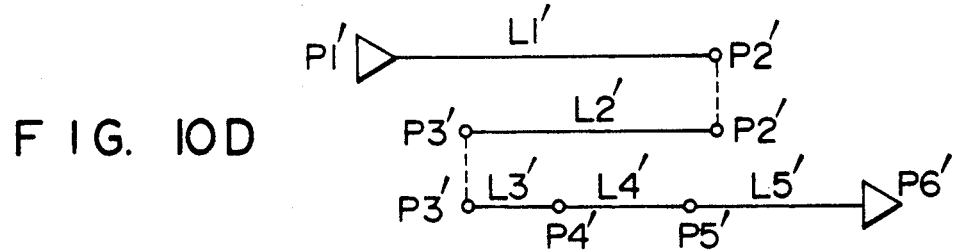
Figure 10E:
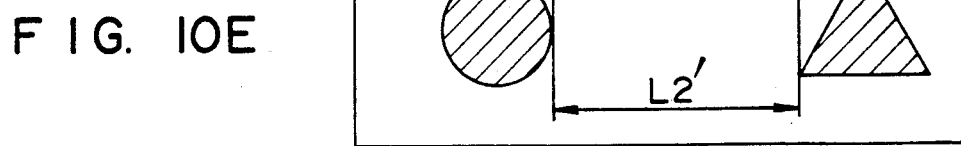

FIGS. 10D and 10E correspond to the case where the interval expansion processing mode is set. The image reader 10 is moved from a position $P_1'$ to a position $P_2'$ and stopped at the position $P_2'$, is then moved to a position $P_3'$ with the direction of movement thereof being changed and is stopped at the position $P_3'$, and is thereafter moved to a position $P_6'$ through positions $P_4'$ and $P_5'$ with the direction of movement thereof being changed again. Moving paths between the positions $P_1'$ to $P_6'$ are represented by $L_1'$ to $L_5'$, respectively. The image reader 10 is moved in a forward direction on the paths $L_1'$, $L_3'$, $L_4'$ and $L_5'$ and moved in a reverse direction on the path $L_2'$. The path $L_4'$ between the positions $P_4'$ and $P_5'$ corresponds to the interval S between the two images.

In the image reading in this interval expansion processing mode, since position data x on the moving path $L_4'$ in a region in the interval S between the two images is replaced by the reverse-direction movement $L_2'$, an interval between the two images in the image processing work memory 4 and the display memory 6 ultimately amounts to $L_2'$. This editing processing, too, is performed by steps 110 to 114 in the interval expansion processing mode.

In the above-mentioned embodiments, the image reader 10 is moved only once in the reverse direction. However, the image reader may be moved in the reverse direction more than one time such as movements in forward-direction, reverse-direction, forward-direction, reverse-direction, forward-direction and so on. In this case, the reverse progression length L is initialized at the step 96 as shown in FIG. 1 each time the movement of the image reader is changed from the forward direction to the reverse direction so that the past value of the reverse progression length L is made invalid and the distance S is finally substituted by the distance in the last movement of the image reader in the reverse direction.

As has been mentioned above, according to the present embodiment, it is possible to acquire read data at which intervals between a plurality of images separated by background regions having no image are adjusted through a consecutive operation for movement of an image reader. Therefore, it is possible to simplify an operation in the subsequent read data editing work.

As apparent from the foregoing, the present invention makes it possible to adjust a distance between image data regions in read data by reciprocally moving an image reader on a recording medium. As a result, there is obtained an effect that an inputting operation in the subsequent read data edit processing work can be simplified.

I claim:

1. An image reading processing apparatus comprising:

image reading means having an elongated and substantially linear reading aperture for reading, when said reading aperture is moved in a direction substantially perpendicular to the direction of elongation of said reading aperture and in contact with a surface of a medium on which an image to be read is recorded, a portion of said image facing said reading aperture and outputting image data representing the image portion as read and movement data relating to the movement of said reading aperture;

control means for defining a position of said image data based on said movement data and editing said image data to include information of the defined position of said image data, said control means including means for detecting a direction of movement of said reading aperture relative to said medium based on said movement data, means for validating said image data read during the movement of said reading aperture when detection of movement of said reading aperture in a first direction occurs and invalidating said data when detection of movement of said reading aperture in a second direction substantially different from said first direction occurs, means for determining when movement of said reading aperture in the second direction occurs by a predetermined distance of movement in the second direction of said reading aperture, and blank distance changing means for changing, when a blank region including no image data continues more than a predetermined distance during the movement of said reading aperture in said first direction, an original distance of said blank region in said first direction to a changed distance based on said movement of said reading aperture in said second direction; and memory means for storing the edited image data with the edited data being stored as a function of said changed distance.

2. An image reading processing apparatus according to claim 1 wherein said second direction is a direction which is reverse to said first direction.

3. An image reading processing apparatus according to claim 1 wherein said blank distance changing means includes means for substituting said changed distance of said blank region for said original distance.

4. An image reading processing apparatus according to claim 3 wherein when the movement of the image reading means in the second direction is repeated a plurality of times and the changed distance of said blank region of the last movement of said image reading means in the second direction is substituted for the original distance.

5. An image reading processing apparatus according to claim 3 wherein said second direction is a direction which is reverse to said first direction.

6. An image reading processing apparatus comprising:

image reading means movable relative to a medium surface on which an image to be read is recorded for reading, when the image reading means is moved in a first direction relative to said medium surface, the image being read by repeating a line scanning in a direction substantially perpendicular to relative movement of said image reading means along the surface medium and outputting image data representing the read image and movement data relating to the relative movement of said image reading means;

means for detecting a direction of the movement of said image reading means relative to said medium surface based on said movement data;

means for determining when said image reading means moves in a second direction substantially different than said first direction a distance said image reading means has been moved in said second direction; and blank distance changing means for changing, when a blank region including no image data continues more than a predetermined distance during the movement of said image reading means in said first direction, an original distance of said blank region in said first direction to a changed distance in said first direction based on movement of said reading aperture in said second direction.

7. An image read processing apparatus according to claim 6 wherein said second direction is a direction which is reverse to said first direction.

8. An image reading processing apparatus according to claim 6 wherein said blank distance changing means includes means for substituting the changed distance of said blank region for said original distance.

9. An image reading processing apparatus according to claim 8 wherein when the movement of the image reading means in the second direction is repeated a plurality of times and the changed distance of said blank region of the last movement of said image reading means in the second direction is substituted for the original distance.

10. An image reading processing apparatus according to claim 8 wherein said second direction is a direction which is reverse to said first direction.

11. An image read processing apparatus according to claim 6 wherein a distance of movement of said image reader is defined by the number of repetitions of said line scanning performed during the movement of said image reading means.

* * * * *